Patented June 7, 1949

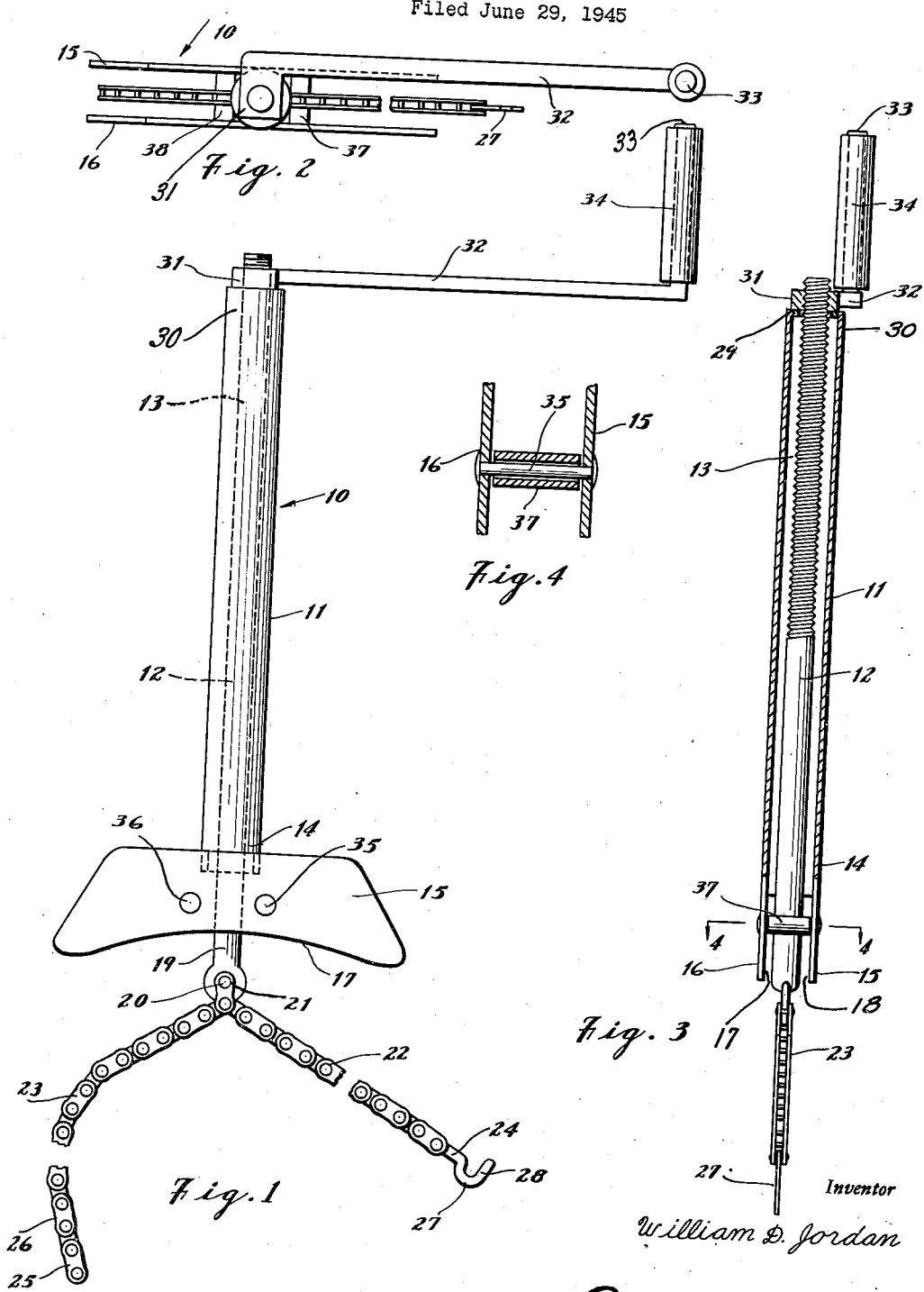

2,472,080

UNITED STATES PATENT OFFICE 2,472,080

BARREL CONTRACTING TOOL

William D. Jordan, Anamosa, Iowa

Application June 29, 1945, Serial No. 602,357

1 Claim. (Cl. 147—4)

My invention relates to cooperage devices and has for an object to provide means whereby a barrel may be headed and hooped rapidly and by one man.

Another object of the invention is to provide means for clamping the ends of barrel staves upon a head therefor and holding the same clamped while applying hoops around said stave ends.

A further object of this invention is to provide a device whereby loosened, warped or otherwise impaired staves of a barrel may be quickly and securely brought into proper position whereby hoops may be easily applied to the barrel.

Other features and advantages will become more readily apparent from the following description and the accompanying illustrative drawings in which:

Figure 1 is an elevational view of my device,

Figure 2 is an end view thereof,

Figure 3 is a sectional elevation of the invention, and

Figure 4 is a section on line 4—4 of Figure 3.

In the accompanying drawings as above enumerated and in the following specification, like characters of reference indicate like parts throughout and in which 10, indicates my invention which consists of a longitudinal tube 11, through which operates a rod 12, screw-threaded at its outer end 13. Fixed to the inner end 14 of the tube is a pair of jaw members 15 and 16, which comprise a pair of plates welded or otherwise secured to the opposing sides of the tube 11, which plates are provided with outer arcuate edges 17 and 18, to conform to the contour of a barrel upon which the device is to be used. To the inner extending end 19, of the member 12, is secured pivotally at 20, to an eye 21, of said end 19, a pair of chains 22 and 23, which are adapted to be extended around a barrel to be operated upon and which chain 22 is provided with a terminal hook 24, for engagement with any one of the links 25, 26, etc., of the chain 23. The hook 24, is provided with an inwardly projecting portion 27, adapted to bear upon the barrel in order to hold the hook end 28 securely in its link through the pressure of said barrel upon the part 27. The upper end of the tube 11 is closed except for an aperture 29 through which the screw-threaded portion of rod 12 is slidable. Seated upon said upper end 30, is the screw-threaded right angular end 31, of a crank handle 32, having a right angular terminal 33, upon which is rotatably mounted a spool 34, for a hand grip.

When the chains 22 and 23, are placed around the head end of a barrel and secured together by the hook 28, the handle 32 may be rotated in order to screw out the threaded end 13, of the rod 12, whereby the chains will be drawn as tightly as required around the barrel after the head has been placed in position in order that the barrel hoops may be seated in place upon the ends of the barrel staves. It is obvious that the chains may be placed around any portion of a barrel in order either to tighten up hoops thereon or straighten out warped or misplaced staves. It may be stated that the members 15 and 16, are connected by pivot pins 35 and 36, upon which are mounted spacing rollers 37 and 38, between which the chains are adapted to operate when the rod is drawn inwardly of the tube 11.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A barrel tightener comprising a hollow handle being open at one end and having an axially apertured closure in its opposite end, spaced parallel laterally extending jaw plates secured to said handle at its open end and formed with opposed arcuate barrel-engaging jaw surfaces, spaced pins secured between said jaw plates, antifriction rollers disposed on said pins, a screw slidably disposed through said handle and apertured closure having an eye on its end adjacent the open end of said handle, a fixed link connected with said eye, a chain secured intermediate its ends to said fixed link, a hook on one end of said chain, an operating arm formed with a threaded opening forming a nut adapted to extend over the threaded outer end of said screw, and an operating handle formed on the outer end of said operating arm for rotating said operating arm to draw said chain into said hollow handle when placed about a barrel for securing a barrel head.

WILLIAM D. JORDAN.

REFERENCES CITED

The following references are of record in the file of this patent:

UNITED STATES PATENTS

| Number | Name | Date |
|---|---|---|
| 336,468 | Bonnichesen et al. | Feb. 16, 1886 |
| 371,792 | Sabourin | Oct. 18, 1887 |
| 459,921 | Wyttenbach | Sept. 22, 1891 |
| 511,202 | Haussmann et al. | Dec. 19, 1893 |
| 744,566 | Koll | Nov. 17, 1903 |
| 1,510,256 | Conning | Sept. 30, 1924 |
| 1,713,694 | Elliott | May 21, 1929 |
| 1,888,770 | Posey | Nov. 22, 1932 |

FOREIGN PATENTS

| Number | Country | Date |
|---|---|---|
| 5,853 | Austria | Nov. 25, 1901 |